(12) United States Patent
Kierbel

(10) Patent No.: US 12,534,211 B2
(45) Date of Patent: Jan. 27, 2026

(54) PROPULSION SYSTEM FOR AN AIRCRAFT, SAID PROPULSION SYSTEM COMPRISING A REVERSIBLE FUEL CELL

(71) Applicant: Airbus SAS, Blagnac (FR)

(72) Inventor: Daniel Kierbel, Blagnac (FR)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 18/643,495

(22) Filed: Apr. 23, 2024

(65) Prior Publication Data
US 2024/0359802 A1  Oct. 31, 2024

(30) Foreign Application Priority Data
Apr. 25, 2023 (FR) ..................... 2304133

(51) Int. Cl.
*B64D 27/355* (2024.01)
*B64D 37/30* (2006.01)
*H01M 8/04082* (2016.01)
*H01M 8/04089* (2016.01)

(52) U.S. Cl.
CPC ........... *B64D 27/355* (2024.01); *B64D 37/30* (2013.01); *H01M 8/04089* (2013.01); *H01M 8/04201* (2013.01); *H01M 2250/20* (2013.01)

(58) Field of Classification Search
CPC .... B64D 27/35; B64D 27/351; B64D 27/355; B64D 37/30; H01M 2250/20
See application file for complete search history.

(56) References Cited

U.S. PATENT DOCUMENTS

| | | | | |
|---|---|---|---|---|
| 5,159,808 A | * | 11/1992 | Kast | F02M 37/18 |
| | | | | 60/734 |
| 12,212,025 B2 | * | 1/2025 | Ballantine | B64F 1/36 |
| 12,304,646 B2 | * | 5/2025 | Roberts | F02C 7/22 |
| 2005/0167172 A1 | * | 8/2005 | Fernandez | B60L 58/34 |
| | | | | 180/65.8 |
| 2011/0198439 A1 | | 8/2011 | Rötger et al. | |
| 2013/0108939 A1 | | 5/2013 | Besse et al. | |
| 2014/0339367 A1 | | 11/2014 | Sankrithi et al. | |
| 2022/0131165 A1 | * | 4/2022 | Ballantine | B64D 37/30 |
| 2022/0238895 A1 | * | 7/2022 | Piesker | F01K 25/04 |
| 2022/0411083 A1 | | 12/2022 | Kierbel | |
| 2023/0086167 A1 | | 3/2023 | Milliere et al. | |

(Continued)

FOREIGN PATENT DOCUMENTS

| | | |
|---|---|---|
| CN | 102934274 A | 2/2013 |
| CN | 113232869 A | 8/2021 |
| CN | 115892486 A | 4/2023 |

(Continued)

OTHER PUBLICATIONS

French Search Report for corresponding French Patent Application 2304133 dated Oct. 17, 2023.

*Primary Examiner* — Philip J Bonzell
*Assistant Examiner* — Cindi M Curry
(74) *Attorney, Agent, or Firm* — Greer, Burns & Crain, Ltd.

(57) ABSTRACT

A propulsion system including an electric motor, the output of which drives a propeller, and a reversible fuel cell comprising a cathode and an anode connected to the electric motor, a supply line connecting the fuel cell to the dihydrogen tank and a feed line connecting the fuel cell to the temporary water tank.

6 Claims, 4 Drawing Sheets

(56) References Cited

U.S. PATENT DOCUMENTS

2023/0223572 A1* 7/2023 Wang .................. H01M 8/249
429/428

FOREIGN PATENT DOCUMENTS

| DE | 102020002414 A1 | 6/2020 |
| DE | 102020004510 A1 | 9/2020 |
| EP | 2293979 B1 | 9/2015 |
| WO | 2021115660 A1 | 6/2021 |

* cited by examiner

PROPULSION SYSTEM FOR AN AIRCRAFT, SAID PROPULSION SYSTEM COMPRISING A REVERSIBLE FUEL CELL

CROSS-REFERENCES TO RELATED APPLICATIONS

This application claims the benefit of French Patent Application Number 2304133 filed on Apr. 25, 2023, the entire disclosure of which is incorporated herein by way of reference.

FIELD OF THE INVENTION

The present invention relates to a propeller propulsion system for an aircraft, said propeller propulsion system comprising a reversible fuel cell, as well as an aircraft comprising at least one propulsion system of this kind.

BACKGROUND OF THE INVENTION

To enable it to move, an aircraft has a propulsion system comprising an engine and a propeller. The engine generates a rotary motion that is transmitted to the propeller. It is known in the art for a thermal engine to be used, in order to set the propeller in motion. A thermal engine of this kind generally uses kerosene. It is also known in the art for an electric motor to be used to set the propeller in motion. The supply of electrical current to the electric motor is provided from an electric generator that is located remotely from the electric motor, necessitating the installation of relatively long electrical conductors between the electric generator and the electric motor.

The voltage of the current flowing in these electrical conductors is relatively high, which generates high temperatures in the electrical conductors that must then be of large diameter or must be cooled.

It is also known in the art for fuel cells to be used to generate electricity and supply an electric motor. With this technology, it is necessary to supply the fuel cell with dihydrogen, and to do so, it is customary to set up dihydrogen conduits that guide the dihydrogen to the fuel cell.

An installation of this kind requires a tank to be filled with dihydrogen that may, in some cases, not be available at the airport where the aircraft is parked. It is therefore necessary to find a propulsion system that can recharge the dihydrogen tank when it is on the ground.

SUMMARY OF THE INVENTION

An object of the present invention is to propose a propeller or shrouded fan propulsion system including a reversible fuel cell that allows refilling the dihydrogen tank through water electrolysis in the fuel cell.

To this end, a propulsion system for an aircraft is proposed that includes a tank containing dihydrogen and is parked on a tarmac with a temporary tank containing water and an electric generator, the propulsion system including:
  a nacelle,
  an electric motor fixed inside the nacelle and including an outlet on which a shaft, a first electrical terminal and a second electrical terminal are mounted,
  a propeller rotated by said shaft,
  a reversible fuel cell with at least one anode electrically connected to the first electrical terminal and at least one cathode electrically connected to the second electrical terminal, where the anodes and cathodes are intended to be electrically connected to the electric generator,
  a supply line intended to fluidically connect the tank to the fuel cell,
  a feed line intended to fluidically connect the fuel cell to the temporary tank, and
  a pump arranged on the supply line between the tank and the fuel cell, and the pump is reversible to alternately drive the dihydrogen from the tank to the fuel cell or from the fuel cell to the tank.

Thanks to the reversible fuel cell and to the reversible pump, such propulsion system allows the displacement of the dihydrogen in both directions and the filling of the tank with dihydrogen during layovers.

Advantageously, the propulsion system includes a heat exchanger arranged to ensure an exchange of calories between the electric motor and the dihydrogen in the supply line.

Advantageously, the nacelle has an annular air duct around a longitudinal direction and the reversible fuel cell includes:
  a core around the longitudinal direction,
  open ducts around the core, where each open duct has an open inlet into the air duct and an open outlet into the air duct and downstream of the open inlet with respect to the airflow direction in the air duct,
  for each open duct, a fuel chamber having a first inlet and a second inlet, where the supply line is fluidically connected to each first inlet and where the feed line is fluidically connected to each second inlet,
  for each pair consisting of an open duct and a fuel chamber, an electrolyte between the open duct and the fuel chamber,
  between each open duct and the adjacent electrolyte, a cathode, and
  between each fuel chamber and the adjacent electrolyte, an anode.

Advantageously, each open duct has an inlet area smaller than the area of an intermediate zone between the inlet and the outlet, and where the outlet area is smaller than the area of the intermediate zone.

According to a particular embodiment, the open ducts are coaxial with each other around the longitudinal direction, between two consecutive open ducts, the fuel cell comprises an annular fuel chamber, and between the fuel chamber and each open duct, the fuel cell comprises an electrolyte.

According to another particular embodiment, the open ducts are arranged side by side and distributed angularly around the longitudinal direction, and around each open duct, the fuel cell comprises an annular electrolyte around the axis of the open duct and around the electrolyte, an annular fuel chamber around the axis of the open duct.

Advantageously, the propulsion system includes a thermally insulating layer that is disposed between the fuel cell and the electric motor.

The invention also provides an aircraft parked on a tarmac with a temporary tank containing water and an electric generator and having a tank containing dihydrogen and a propulsion system according to any of the preceding variants, in which the anodes and cathodes are electrically connected to the electric generator, in which the fuel cell is fluidically connected to the tank through the supply line and to the temporary tank through the feed line.

Advantageously, the aircraft includes a fuselage and the tank is located to the rear of the fuselage.

BRIEF DESCRIPTION OF THE DRAWINGS

The features of the invention referred to above, as well as others, will become clearer upon reading the following description of an exemplary embodiment, said description being provided in relation to the attached drawings, in which.

DETAILED DESCRIPTION OF THE PREFERRED EMBODIMENTS

Figure 1:
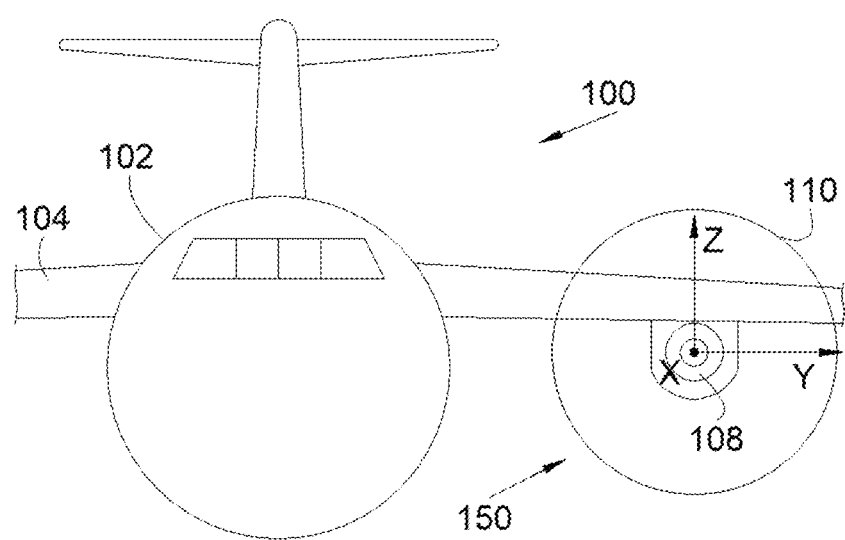
FIG. 1 is a front view of an aircraft including a propulsion system according to the invention.

In the following description, terms relating to a position are referenced to an aircraft in a forward position, in other words as depicted in FIG. 1, in which the direction of the X-axis shows the forward direction of the aircraft.

FIG. 1 shows an aircraft 100 which has a fuselage 102 with a wing 104 fixed to either side. At least one propeller propulsion system 150 is fixed under each wing 104. In the embodiment of the invention presented in FIG. 1, there is one propulsion system 150 per wing 104.

In the following description, and by convention, X denotes the longitudinal direction of the propulsion system 150 oriented positively in the forward direction of the aircraft 100, Y denotes the transverse direction of the propulsion system 150 which is horizontal when the aircraft is on the ground and Z denotes the vertical direction or vertical height when the aircraft is on the ground, these three directions X, Y and Z being orthogonal to one another.

The propulsion system 150 comprises a propeller 110 and an electric motor 108 which is fixed to the wing 104 and has an outlet on which a shaft is mounted that rotates the propeller 110 when the electric motor 108 operates. The rotational axes of the shaft and the propeller 110 are parallel to the longitudinal direction X and in the embodiments presented in the different FIGS., the rotational axes coincide with the longitudinal direction X.

Figure 2:
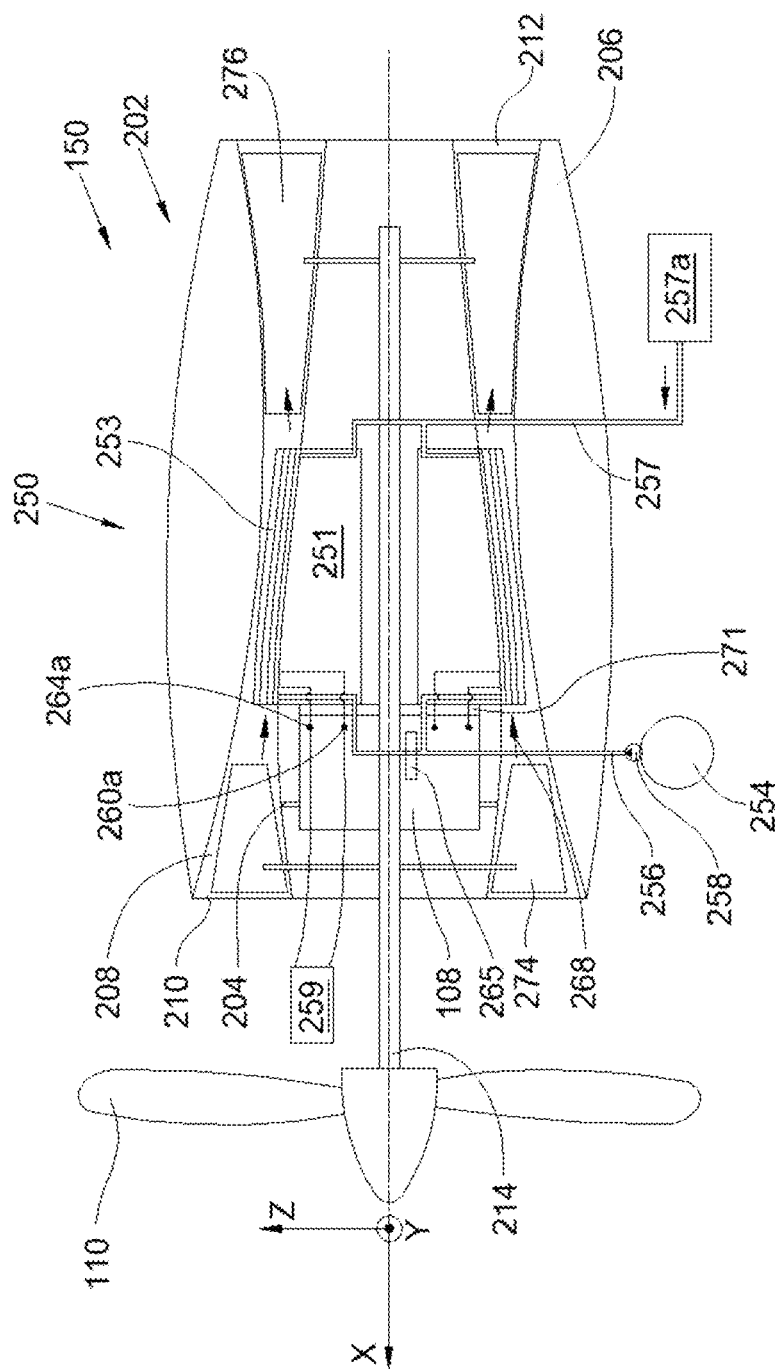
FIG. 2 is a side, sectional view of a propulsion system according to a first embodiment of the invention.

FIG. 2 shows the propulsion system 150 according to a first embodiment of the invention. The propulsion system 150 includes a nacelle 202 that has a structure 204 and outer cowls 206 that are fixed on the structure 204 and form an aerodynamic outer surface. The nacelle 202 also has an air duct 208 which is annular around the longitudinal direction X and which opens at the front at an intake port 210 and at the rear through an exhaust port 212.

The electric motor 108 is fixed to the structure 204 inside the nacelle 202 and projects its shaft 214 forwards and the propeller 110 is rotated by the shaft 214 and arranged forwards in respect of the intake port 210. The electric motor 108 has a first electrical terminal and a second electrical terminal.

The propulsion system 150 comprises a fuel cell 250 which is a cell in which the generation of electrical voltage is achieved thanks to the oxidation on an electrode of a reducing agent, the dihydrogen in liquid or gaseous form and stored in a tank 254 of the aircraft 100, coupled with the reduction on the other electrode of an oxidant, the dioxygen from the air. The tank 254 is installed in the aircraft 100, for example in the wings 104 or in the fuselage 102 and, more particularly, at the rear of the fuselage 102.

The fuel cell 250 is reversible, meaning that when it is supplied with water and electricity, it generates dihydrogen that can be stored in a dihydrogen tank and dioxygen.

The fuel cell 250 therefore has a first operating mode in which it generates electricity and water from dihydrogen and dioxygen and a second operating mode, in which it generates dihydrogen and dioxygen from water and electricity.

With a fuel cell 250 of this kind, it is therefore possible, by supplying it with water and electricity, to fill the dihydrogen tank 254 of the aircraft 100 for the subsequent flight. The fuel cell 250 is fixed to the structure 204 inside the nacelle 202 behind the electric motor 108 and it is made up of several annular layers around the longitudinal direction X.

In general, the fuel cell 250 has at least one anode 260 electrically connected to the first electrical terminal and at least one cathode 264 electrically connected to the second electrical terminal.

In the embodiment of the invention presented here, the anodes 260 are electrically connected to a first electrode 260a electrically connected to the first electrical terminal of the electric motor 108 and the cathodes 264 are electrically connected to a second electrode 264a electrically connected to the second electrical terminal of the electric motor 108. In the first operating mode, the electric motor 108 is therefore powered by the electrodes 260a and 264a.

In the second operating mode, the first electrode 260a and the second electrode 264a, and consequently the anodes 260 and the cathodes 264, are electrically connected to an electric generator 259 external to the aircraft 100 and placed, for example, on the tarmac of the airport where the aircraft 100 is parked. The connection between the first electrode 260a and the second electrode 264a and the electric generator 259 is made, for example, by an appropriate connector arranged at an outer cowl 206. The electric generator 259 can be a standalone generator or the airport's electrical grid.

An electric switch is possibly interposed between the electrical terminals of the electric motor 108 and the electrodes 260a and 264a, so that said electric motor 108 is not powered in the second operating mode.

The propulsion system 150 also includes a supply line 256 which fluidically connects the tank 254 to the fuel cell 250 and a feed line 257 which fluidically connects the fuel cell 250 to a temporary tank 257a containing water and placed, for example, on the tarmac of the airport where the aircraft 100 is parked.

The connection between the feed line 257 and the temporary tank 257a is made, for example, by an appropriate connector arranged at an outer cowl 206.

In the first operating mode, the supply line 256 transports low-temperature dihydrogen and here passes through a heat exchanger 265 which ensures a calorie exchange between the electric motor 108 and the dihydrogen in the supply line 256. This arrangement allows the temperature of the electric motor 108 to be reduced in order to improve its efficiency and the temperature of the dihydrogen to be increased before it arrives in a fuel chamber 252 described below in a particular embodiment of the invention.

In the second operating mode, the heat exchanger 265 can be used to reduce the temperature of the dihydrogen before sending it to the tank 254. The heat exchanger 265 is therefore arranged to ensure a calorie exchange between the electric motor 108 and the dihydrogen in the supply line 256.

According to a particular embodiment, the propulsion system 150 includes a pump 258 arranged on the supply line 256 between the tank 254 and the fuel cell 250, and the pump 258 is a reversible pump to drive the dihydrogen alternately from the tank 254 to the fuel cell 250 in the first operating mode or from the fuel cell 250 to the tank 254 in the second operating mode. According to a particular embodiment, the pump 258 is driven by the electric motor 108.

According to a particular embodiment, the pump 258 is also the one that drives the dihydrogen into the heat exchanger 265. The installation of a reversible pump 258 on the supply line 256 therefore allows the introduction of the dihydrogen into the tank 254 to be facilitated.

In the embodiment of the invention presented here, the fuel cell 250 includes a core 251 which is around the longitudinal direction X, in this case around the shaft 214, and outside the air duct 208, that is, below said air duct 208. The core 251 ensures the attachment of the fuel cell 250 to the structure 204.

The fuel cell 250 also includes open ducts 253, where each open duct 253 has an open inlet in the air duct 208 and an open outlet in the air duct 208 and downstream of the open inlet with respect to the airflow direction in the air duct 208. A distribution of this kind allows for better distribution of the dioxygen in the open duct 253.

Hence, in the first operating mode, the air entering through the intake port 210 enters through an inlet into an open duct 253 and exits said open duct 253 through an outlet to join the air duct 208 and the exhaust port 212. Each inlet faces the airflow (arrow 268) entering through the intake port 210.

Each open inlet allows the introduction of dioxygen-rich air into each open duct 253 and the open outlet allows the evacuation of dioxygen-depleted air and water produced by the fuel cell 250.

Hence, the supply of dioxygen to the fuel cell 250 does not require any particular conduit. Each open duct 253 constitutes a dioxygen chamber.

Here, each open inlet is oriented towards the intake port 210 and each open outlet is oriented towards the exhaust port 212.

Figure 3:
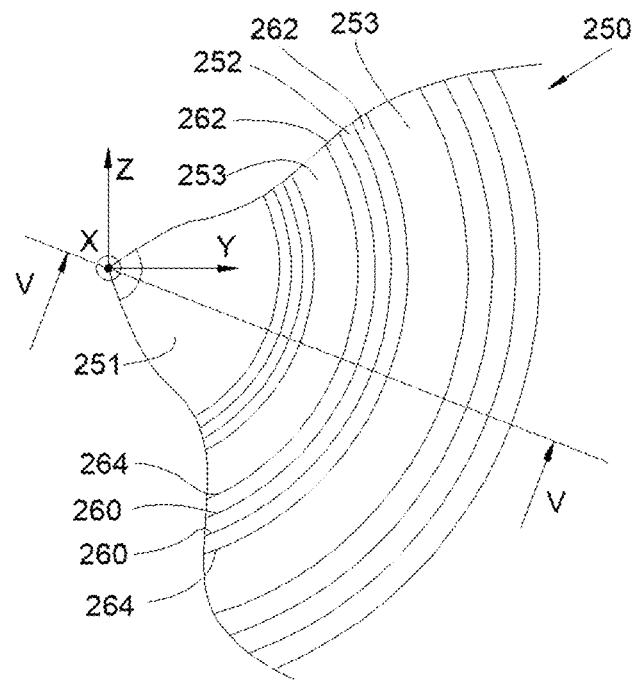
FIG. 3 is a partial front view of a fuel cell according to a first arrangement.

FIG. 3 shows a first arrangement in which the open ducts 253 are coaxial ducts with one another around the longitudinal direction X.

Between two consecutive open ducts 253, the fuel cell 250 includes an annular fuel chamber 252 around the longitudinal direction X, and between the fuel chamber 252 and each open duct 253, the fuel cell 250 includes an annular electrolyte 262 around the longitudinal direction X.

Figure 4:
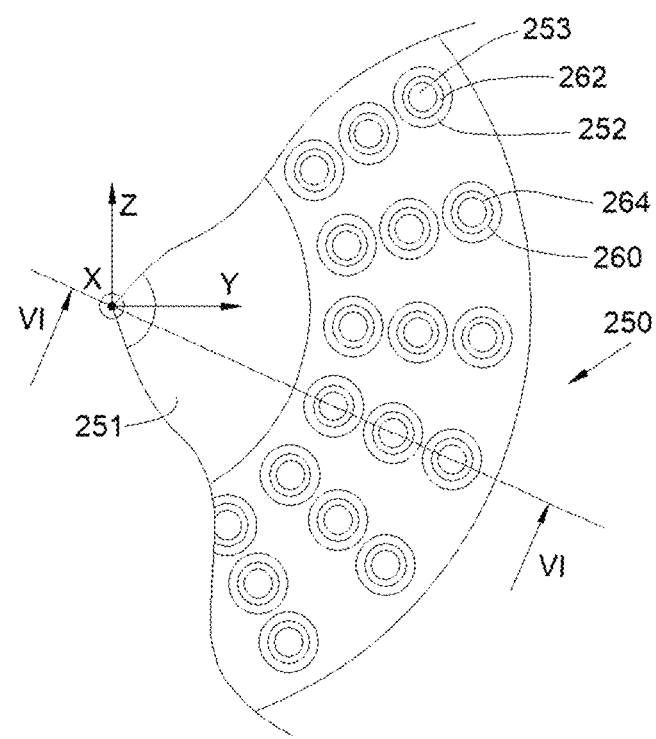
FIG. 4 is a partial front view of a fuel cell according to a second arrangement.

FIG. 4 shows a second arrangement in which the open ducts 253 are ducts, in this case cylindrical ducts, arranged next to one another and distributed angularly around the longitudinal direction X.

Around each open duct 253, the fuel cell 250 includes an annular electrolyte 262 around the axis of the open duct 253 and around the electrolyte 262, an annular fuel chamber 252 around the axis of the open duct 253. The axis of the open duct 253 in this case is parallel to the longitudinal direction X.

The walls separating the different layers are held in position, for example, by spacers.

Between each open duct 253 and the neighboring electrolyte 262, the fuel cell 250 includes a cathode 264, and between each fuel chamber 252 and the neighboring electrolyte 262, the fuel cell 250 includes an anode 260.

Hence, in general, for each open duct 253, the fuel cell 250 includes a fuel chamber 252 supplied with fuel, and for each pair made up of an open duct 253 and a fuel chamber 252, an electrolyte 262 between the open duct 253 and the fuel chamber 252.

Each fuel chamber 252 forms a closed space and it includes at least one first inlet 252a through which, in the first operating mode, dihydrogen is introduced, and at least one second inlet 252b through which, in the second operating mode, water is introduced.

The first inlet 252a of each fuel chamber 252 is fluidically connected by the supply line 256 to the dihydrogen tank 254 and is equipped in this case with the pump 258 intended to drive the dihydrogen in the supply line 256.

The second inlet 252b of each fuel chamber 252 is fluidically connected to the feed line 257 which is, in the second operating mode, fluidically connected to the temporary tank 257a.

Figure 5:
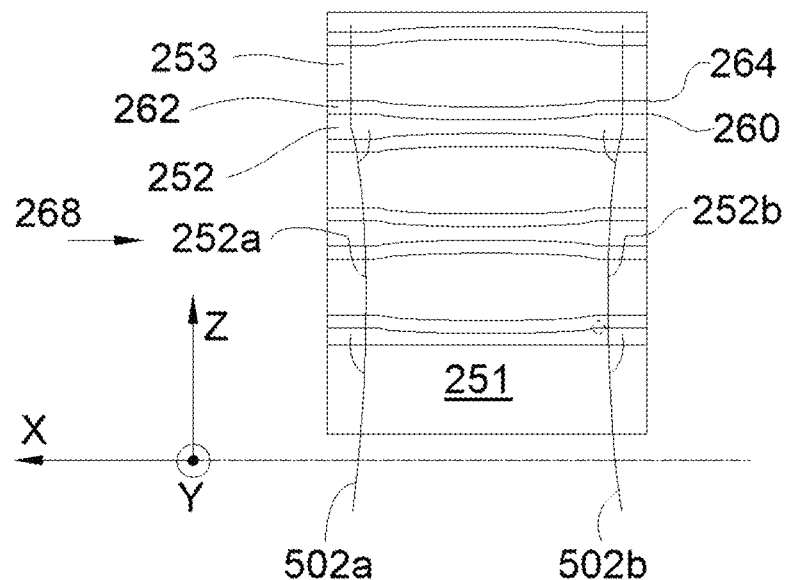
FIG. 5 is a sectional view of the fuel cell along line V-V in FIG. 3.

FIG. 5 shows a sectional view of the fuel cell 250 in FIG. 3.

Figure 6:
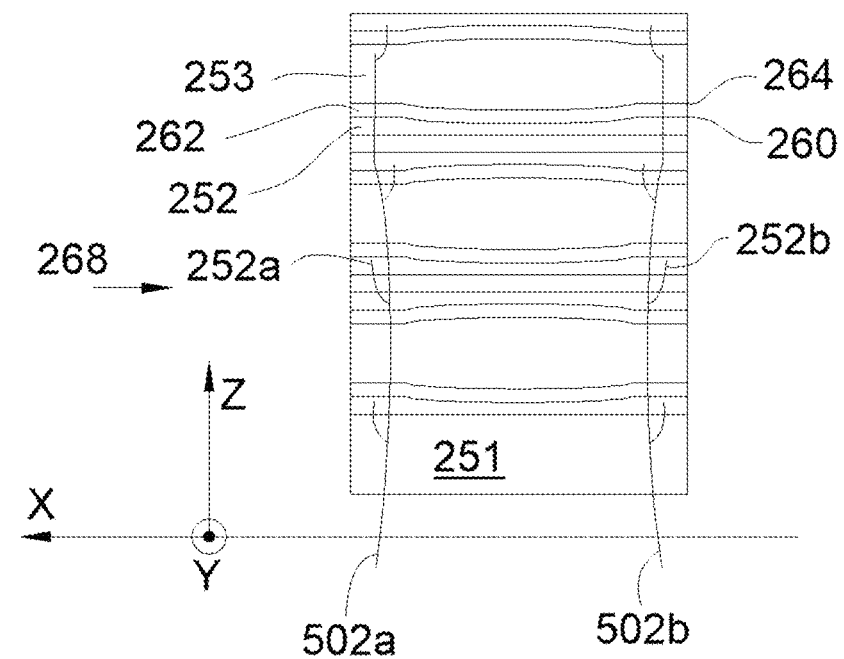
FIG. 6 is a sectional view of the fuel cell along line VI-VI in FIG. 4.

FIG. 6 shows a sectional view of the fuel cell 250 in FIG. 4.

The supply of dihydrogen to each fuel chamber 252 is carried out by inlet lines 502a which run inside the fuel cell 250 and which are fluidically connected to the supply line 256.

The supply of water to each fuel chamber 252 is carried out by inlet lines 502b which run inside the fuel cell 250 and which are fluidically connected to the feed line 257.

Hence, in the first operating mode, the dihydrogen from each fuel chamber 252 and the dioxygen from each open duct 253 react through the electrolyte 262 to generate electricity available at the first electrode 260a and the second electrode 264a and create water that is evacuated from the fuel chamber 252 through the feed line 257 to the outside of the aircraft 100.

Hence, in the second operating mode, the water from each fuel chamber 252 and the electricity available at the first electrode 260a and the second electrode 264a react through the electrolyte 262 to create dihydrogen which is evacuated to the dihydrogen tank of the aircraft 100 through the supply line 256.

The cooling of the fuel cell 250 is ensured, at least in part, by the air passing through the open ducts 253. Of course, an additional cooling system can be installed and it can take any shape known to a person skilled in the art, such as a heat exchanger, for example.

The fuel cell 250 thereby arranged allows, particularly in the first operating mode, the external air circulating in the air duct 208 to be used to generate current and to cool, and its integration into the nacelle 202 limits the electrical conductors between the electric motor 108 and the fuel cell 250.

In order to obtain good thermal exchange in the open duct 253 and good dioxygen exchange to generate electricity, particularly in the first operating mode, each open duct 253 has an evolving section along the path of the air in said open duct 253.

As shown in FIG. 5 and FIG. 6, the open duct 253 has an inlet surface that is smaller than the surface of the intermediate zone between the inlet and the outlet, and the outlet surface is smaller than the surface of the intermediate zone. Each surface corresponds to a section through a plane perpendicular to the longitudinal direction X.

With an installation of this kind, a Venturi effect is obtained, which slows down the airflow speed in the intermediate zone and then accelerates it as it leaves the intermediate zone. According to a particular embodiment, the inlet surface and the outlet surface are sized to obtain a Mach 0.6 velocity, and the surface of the intermediate zone is sized to obtain a Mach 0.3 velocity.

In order to increase the airflow entering the air duct 208, the propulsion system 150 includes in the air duct 208 at the intake port 210, a compressor 274 that takes the form of fins driven in rotation around the longitudinal direction X by the shaft 214, for example.

It is also possible to pass the supply line 256 through the air duct 208 in the vicinity of the compressor 274, in order to cool the air in the air duct 208 and, consequently, the compressor 274.

In order to increase the airflow leaving the air duct 208 and increase heat dissipation, the propulsion system 150 includes in the air duct 208 at the exhaust port 212, a turbine 276 that takes the form of fins driven in rotation around the longitudinal direction X by the shaft 214. The shaft 214 then passes through the fuel cell 250 from front to rear.

The turbine 276 can also allow the shaft 214 to be driven, in order to lighten the workload of the electric motor 108 and therefore lower the electrical requirements.

The fuel cell 250 generates high temperatures that can limit the performance of the electric motor 108. In order to limit this impact, the propulsion system 150 includes a thermally insulating layer 271 that is disposed between the fuel cell 250 and the electric motor 108. A thermal insulator of this kind is, for example, of the carbon aerogel type. In the embodiment in FIG. 4, the fuel chambers 252 and the electrolytes 262 are arranged around the open duct 253, but it is also possible to arrange the fuel chamber 252 next to the open duct 253 by placing the electrolyte 262 between them.

The propulsion system 150 and all these elements are preferably controlled by a FADEC-type controller to regulate, among other things, the fuel flow rate, the speed of rotation of the motor shaft, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft that includes a tank containing dihydrogen and configured to be parked on a tarmac with a temporary tank containing water and an electric generator, the propulsion system including:
   a nacelle,
   an electric motor fixed inside the nacelle and including a shaft, a first electrode, and a second electrode,
   a propeller rotated by said shaft,
   a reversible fuel cell with at least one anode electrically connected to the first electrode and at least one cathode electrically connected to the second electrode, wherein the at least one anode and at least one cathode are configured to be electrically connected to the electric generator,
   a supply line configured to fluidically connect the tank to the fuel cell,
   a feed line configured to fluidically connect the fuel cell to the temporary tank, and
   a pump arranged on the supply line between the tank and the fuel cell, and wherein the pump is reversible to alternately drive the dihydrogen from the tank to the fuel cell or from the fuel cell to the tank.

2. The propulsion system according to claim 1, further comprising:
   a heat exchanger arranged to exchange calories between the electric motor and the dihydrogen in the supply line.

3. The propulsion system according to claim 1, wherein the nacelle has an annular air duct around a longitudinal direction and the reversible fuel cell includes:
   a core around the longitudinal direction,
   a plurality of open ducts around the core, where each open duct in the plurality of open ducts has an open inlet into the air duct and an open outlet into the air duct and downstream of the open inlet with respect to an airflow direction in the air duct,
   for each open duct in the plurality of open ducts, a corresponding fuel chamber having a first inlet and a second inlet, where the supply line is fluidically connected to each first inlet and where the feed line is fluidically connected to each second inlet,
   a corresponding electrolyte between each open duct in the plurality of open ducts and each corresponding fuel chamber,
   between each open duct and each corresponding electrolyte, a cathode of the at least one cathode, and
   between each fuel chamber and each corresponding electrolyte, an anode of the at least one anode.

4. The propulsion system according to claim 3, wherein each open duct in the plurality of open ducts has an inlet cross-sectional area smaller than an intermediate zone cross-sectional area between the open inlet and the open outlet, and
   wherein an outlet cross-sectional area is smaller than the intermediate zone cross-sectional area.

5. The propulsion system according to claim 1, further comprising:
   a thermally insulating layer disposed between the fuel cell and the electric motor.

6. An aircraft parked on a tarmac comprising:
   a temporary tank containing water,
   an electric generator,
   a tank containing dihydrogen, and
   the propulsion system according to claim 1,
   wherein the at least one anode and the at least one cathode are electrically connected to the electric generator, and
   wherein the fuel cell is fluidically connected to the tank through the supply line and to the temporary tank through the feed line.

* * * * *